Figure 1:
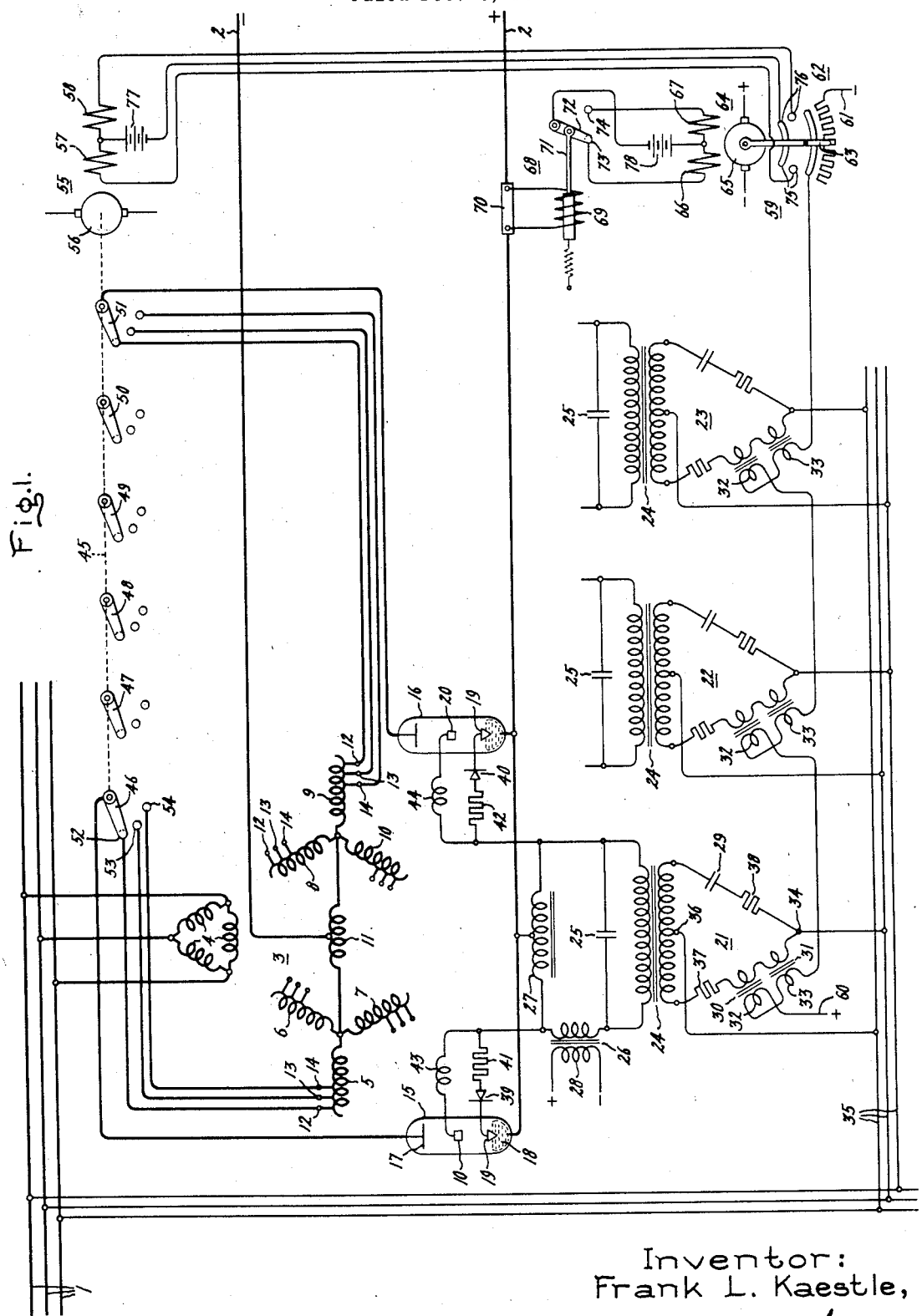

April 13, 1943.  F. L. KAESTLE  2,316,594
ELECTRIC VALVE CONTROL CIRCUITS
Filed Dec. 6, 1941  2 Sheets-Sheet 1

Inventor:
Frank L. Kaestle,
by Harry E. Dunham
His Attorney.

Patented Apr. 13, 1943

2,316,594

UNITED STATES PATENT OFFICE 2,316,594

ELECTRIC VALVE CONTROL CIRCUITS

Frank L. Kaestle, Schenectady, N. Y., assignor to General Electric Company, a corporation of New York Application December 6, 1941, Serial No. 421,949

3 Claims. (Cl. 175—363)

My invention relates to electric valve circuits and more particularly to control or regulating circuits for electric valve translating apparatus.

In electric valve translating apparatus it is of extreme importance in many applications to provide control apparatus which is susceptible of maintaining an electrical condition, such as the voltage or current of an associated circuit, at a precise value throughout wide ranges of load applied to the system. In accordance with the teachings of my invention described hereinafter, I provide new and improved control and regulating systems wherein an electrical condition, such as the voltage or current of a load circuit, is accurately controllable throughout wide ranges of load.

It is an object of my invention to provide new and improved electric valve translating apparatus.

It is another object of my invention to provide new and improved control or regulating circuits for electric valve translating apparatus.

It is a further object of my invention to provide new and improved control circuits for electric valve apparatus of the type employing an ionizable medium, such as a gas or a vapor, and wherein an output condition, such as the voltage or current, is controlled by varying the voltage impressed on a control member of the electric valve apparatus.

It is a still further object of my invention to provide new and improved control circuits for electric valve apparatus of the controlled type wherein control members determine the amount of current transmitted to a load circuit, and wherein provision is made for accurate control of the output current or voltage within wide ranges of load applied to the system.

Briefly stated, in the illustrated embodiments of my invention I provide control and regulating systems for electric valve translating apparatus which comprises electric valve means of the controlled type wherein the output voltage is determined by variable control voltages impressed on the control members or grids of the electric valve apparatus. I also provide variable voltage transforming means connected in circuit with the electric valve means and which is controlled to vary the voltage transformation ratio in response to the excitation means for the control members, or in response to the control means which is associated with the excitation means. In this manner, the regulating or controlling operation of the system is accomplished throughout predetermined ranges by virtue of the excitation means, and upon variation of the load voltage or current from a predetermined value the voltage transformation is changed to accommodate the variation in load.

Figure 2:
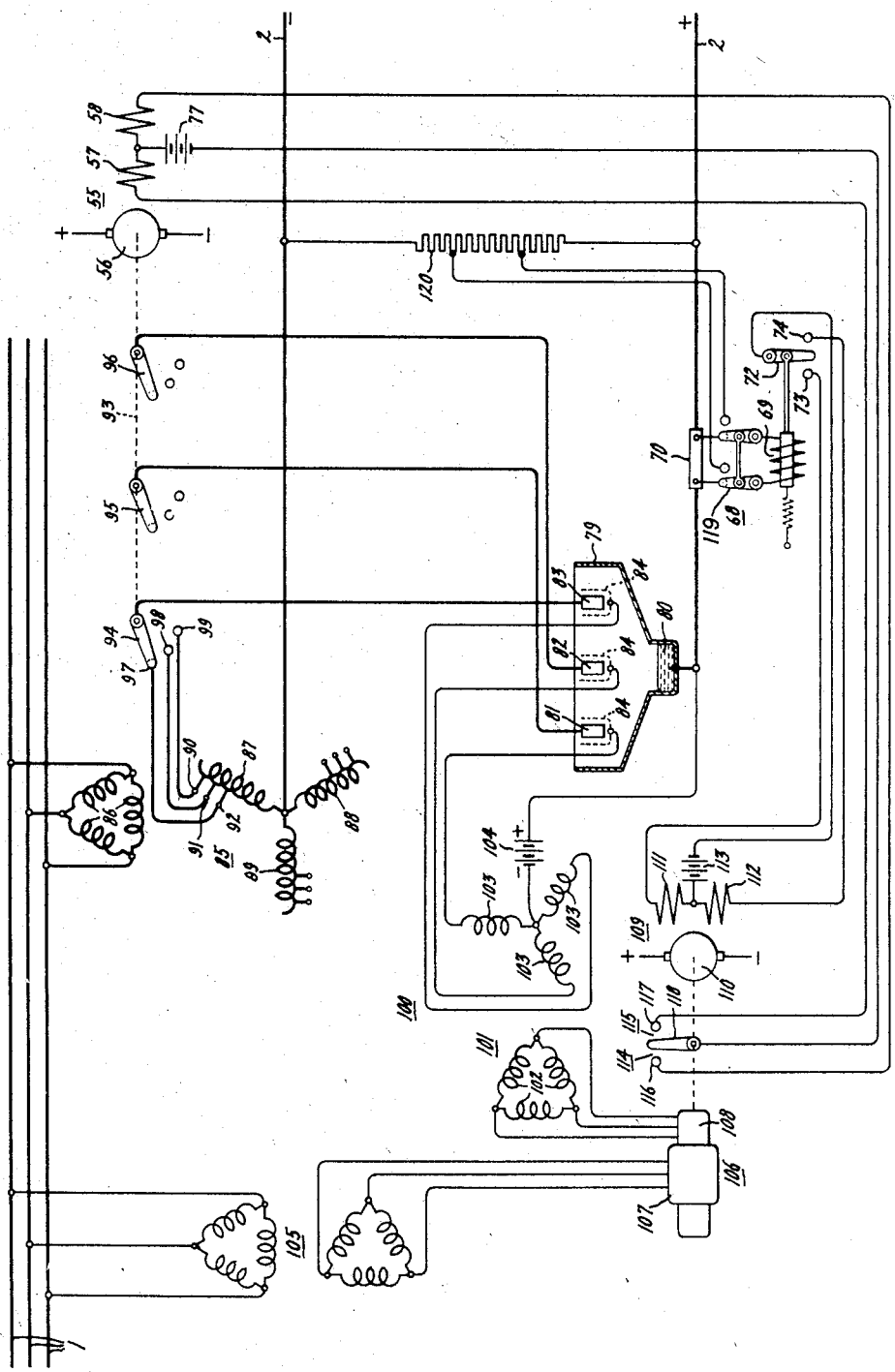

For a better understanding of my invention, reference may be had to the following description taken in connection with the accompanying drawings, and its scope will be pointed out in the appended claims. Fig. 1 of the accompanying drawings diagrammatically illustrates an embodiment of my invention as applied to electric translating apparatus employing electric valve means having control members of the immersion-ignitor type, and Fig. 2 represents a further modification as applied to electric valve means employing grids as the control members.

Referring now to Fig. 1 of the accompanying drawings, my invention is there illustrated as applied to an electric translating system for transmitting energy between an alternating current circuit 1 and a direct current circuit 2. Although not limited thereto, my invention will be described as applied particularly to a polyphase translating system wherein unidirectional current is transmitted to the load circuit 2 from the alternating current supply circuit 1. The translating apparatus comprises an inductive network 3 which is arranged to provide a variable voltage transformation, that is to control the voltage ratio of transformation. The inductive network 3 may comprise a transformer having a plurality of primary windings 4 and a plurality of secondary winding sections 5-10, inclusive, which may be arranged in a double wye connection wherein the respective wye groups are interconnected through the interphase transformer 11 having a point thereof connected to the negative terminal of the direct current circuit 2.

Each of the primary winding sections 5-10 is provided with a plurality of taps 12, 13 and 14 which serve to control the voltage transformation ratio and consequently control the voltage impressed across the direct current load circuit 2 through the electric valve apparatus described hereinafter.

Electric valve means are associated with the secondary winding sections 5-10, inclusive. In the arrangement of Fig. 1 only electric valve means 15 and 16 associated with winding sections 5 and 9 are illustrated. It will be understood that other electric valve means are associated with winding sections 6, 7 and 8, 9 and have been omitted for the purpose of simplifying the presentation of the invention. The electric valve means 15 and 16 are preferably of the type employing an ionizable medium, such as a gas or a vapor, and each comprises an anode 17, a cathode 18 and may include an immersion-ignitor type control member 19 associated with the mercury pool cathode and constructed of a material such as boron carbide or silicon carbide. The electric valve means are rendered conducting when a predetermined current is transmitted through the control members 19. If desired, the electric valve means 15 and 16 may also be provided with transfer or relieving anodes 20 which serve to conduct current upon initiation of arc discharges within the electric valve means, thereby relieving the duty imposed on the control members 19.

In order to transmit to the control members 19 impulses of current of peaked wave form which are variable in phase with respect to the voltage of the alternating current circuit 1 and to control thereby the output voltage or current of the translating system, I provide a plurality of excitation means or circuits 21, 22 and 23. Each of these excitation circuits serves to energize the control members 19 of the electric valve means. Excitation circuit 21 energizes the control members 19 of electric valve means 15 and 16 and serves to render these electric valve means conducting during intervals of time displaced substantially 180 electrical degrees with respect to the voltage of the alternating current circuit 1. Excitation circuits 22 and 23 are, of course, intended for supplying similar impulses of current to the electric valve means (not shown) associated with the winding sections 6 and 7, 8 and 10. The excitation circuits 21—23 are of the type disclosed and broadly claimed in a copending patent application of Ernst F. W. Alexanderson and Albert H. Mittag, Serial No. 374,716, filed January 16, 1941, and which is assigned to the assignee of the present application.

Each of the excitation circuits 21—23, inclusive, is energized from a predetermined phase of the alternating current circuit 1, and each produces an alternating voltage of peaked wave form to render electric valve means associated with diametrically opposed secondary winding sections conducting during intervals of time displaced substantially 180 electrical degrees. These excitation circuits are similar in construction and arrangement, and each comprises a transformer 24, a capacitance 25 which is charged from the transformer 24 and discharged through a saturable inductive device 26, the inductive reactance of which decreases to produce an impulse of current through the auto-transformer 27. The capacitance 25 and the saturable inductive device 26 constitute a resonant circuit of the nonlinear type, that is a circuit which is nonlinearly resonant with respect to the magnitude of the voltage applied to the excitation circuit. The inductive device 26 may be provided with a control winding 28, which may be termed a biasing winding, to produce a shift in the phase displacement between the positive and negative impulses of voltage produced by the excitation circuit and appearing across the auto-transformer 27. In this arrangement, the currents conducted by electric valve means 15 and 16 may be balanced. The inductive reactance of device 26 is substantially greater than the capacitive reactance of the excitation circuit within the lower region of the voltage applied to the excitation circuit and smaller than the capacitive reactance within the upper region, so that an impulse of voltage is produced when the inductive device 26 saturates.

Each of the excitation circuits 21—23 includes a phase shifting circuit connected between the source of alternating current derived from circuit 1 and the aforementioned elements. This phase shifting means may comprise a capacitance 29 and a variable impedance element such as a pair of saturable inductive devices 30 and 31 having unidirectional biasing or control windings 32 and 33, respectively. The inductive devices 30 and 31 comprise one branch of the phase shifting network, and the capacitance 29 constitutes the other branch. The common juncture 34 of the variable impedance element of the phase shifting network and the capacitance 29 is connected to one phase of circuit 35, and the other terminal of this phase is connected to the intermediate connection 36 of the primary winding of transformer 24. A stabilizing resistance 37 may be connected in the phase shifting network in order to obtain a symmetrical alternating voltage of peaked wave form, that is in order to obtain an alternating voltage in which the positive and negative peaks are of symmetrical wave form. If desired, a further stabilizing resistance 38 may be connected in the other branch of the phase shifting network.

The alternating voltages of peaked wave form appearing across the auto-transformer 27 are supplied to control members 19 of electric valve means 15 and 16 through suitable unidirectional conducting devices 39, 40 and transfer resistances 41 and 42, respectively. The relieving or transfer anodes 20 may be connected to the terminals of the auto-transformer 27 through smoothing inductances 43 and 44. Upon the establishment of arc discharges in the electric valve means 15 and 16 and because of the incident increase of current occasioned by the arc discharge, the potential of the relieving anodes 20 will be raised substantially, thereby causing the anodes 20 to conduct the greater portion of the excitation currents and consequently relieve the duty imposed on control members 19.

As a means for controlling the voltage transformation ratio of the inductive network 3, I provide suitable means, such as tap changing apparatus 45 which may comprise a plurality of positionable elements or arms 46–51, inclusive, each of which may be provided with a plurality of stationary contacts 52, 53 and 54 which are connected to taps 12, 13 and 14, respectively, of the associated secondary winding sections 5–10, inclusive, of the inductive network 3.

While for the purpose of facilitating the explanation of my invention I have chosen to represent the tap changing means 45 schematically, it will be understood that this means may be constructed in a manner which permits the changing the taps of the transformer winding sections under load; that is, when the system is operated to transmit current, the tap changing means and associated movable and stationary contacts may be provided with suitable means for making and breaking the contacts under load.

Due to the interconnection of the various individual tap changing instruments, the various taps of the secondary winding sections 5–10, inclusive, will be changed simultaneously, and the system is preferably arranged so that corresponding voltage taps are simultaneously made and broken. Furthermore, it will be observed that the individual tap changing structures selectively engage predetermined taps of the secondary winding sections.

Although I have chosen to represent a mechanical type tap changing mechanism for selectively connecting various portions of the secondary winding sections 5–10 to the electric valve means, it will be understood that my invention may be carried out by using electric valve means as the tap changing means and wherein the different taps of the secondary winding sections are selectively connected and disconnected by controlling the conductivities of the tap changing electric valve means.

As a means for operating the tap changing means 45, I may provide suitable apparatus which may take the form of a motor 55 which comprises an armature 56 and may include a pair of opposing field windings 57 and 58 which control the direction of rotation of the motor 55.

I provide means for controlling the phase position of the periodic or alternating voltages of peaked wave form transmitted to the control members 19 of the electric valve means of the system, and thereby control an electrical condition, such as the voltage or current supplied to direct current circuit 2. In one embodiment of my invention, I provide control means 59 which transmits variable amounts of unidirectional current to the control windings 32 and 33 of the phase shifting circuits associated with excitation circuits 21–23, inclusive. The variable amounts of unidirectional current may be derived from a source of direct current, comprising a positive conductor 60 and a negative conductor 61, which is connected in circuit with a variable impedance element, such as a resistance or rheostat 62. Rheostat 62 comprises a movable element or contact 63 which may be arranged to engage different portions of the resistance.

The rheostat 62 may be operated in response to a predetermined electrical condition of either the alternating current circuit or the direct current circuit, and in the embodiment of my invention illustrated I have chosen to illustrate the rheostat as being controlled in response to the current transmitted by the direct current circuit 2. Rheostat 62 may be operated by a motor 64 having an armature 65 and a pair of opposing field windings 66 and 67 which control the position and the direction of movement of the contact 63 of rheostat 62.

In order to control the operation of the motor 64 in response to a predetermined electrical condition such as the current of the direct current circuit 2, I may employ a current responsive relay 68 having an actuating coil 69 which is energized from a suitable shunt connected in the direct current circuit. Armature 71 may be spring biased and is provided with a movable contact 72 which selectively engages stationary contact 73 or 74. Relay 68 is preferably arranged so that so long as the current of the load circuit remains at a predetermined value, the armature 72 maintains an intermediate position, thereby not engaging either of the contacts 73 or 74. If the current tends to increase above or decrease below the desired value of current, the proper stationary contact is engaged thereby effecting the desired rotation of the motor 64 and to shift thereby the phase of the alternating voltages of peaked wave form supplied to the control members 19 of the electric valve means in the proper direction to restore the current to the desired value.

Motor 64 is also provided with suitable means for controlling the operation of motor 55 and for changing the voltage transformation of the inductive network 3 when the voltage applied to control members 19 has attained a predetermined maximum or minimum phase displacement relative to the voltage of the alternating current circuit 1. In order to accomplish this control, I may employ means, such as a pair of limit switches 75 and 76, which are operated by the movable element of motor 64 when in the extreme positions, thereby indicating the maximum or minimum phase displacement of the voltage applied to the control members 19 relative to the alternating supply voltage. Suitable sources of current, such as batteries 77 and 78, may be employed, if desired, to energize the field windings 57, 58 and 66, 67 of motors 55 and 64, respectively.

The limit switches 75 and 76 may be adjustable to control or adjust the limits of the phase shift range at which the motor 55 is brought into operation. Furthermore, the limit switches 75 and 76 may be adjusted to control the range or duration of the phase shift of the control member voltages.

The operation of the embodiment of my invention shown in Fig. 1 will be explained by considering the system when it is operating as a polyphase rectifier to transmit a constant unidirectional current to the direct current circuit 2. It will be understood that the electric valve means associated with the secondary winding sections 5–10 conduct current in a predetermined order, each electric valve means conducting current for substantially 120 electrical degrees of the voltage of the alternating current circuit 1, and that each electric valve means conducts current at the same time with an electric valve in the other wye group. It is to be understood furthermore that any one electric valve means in one wye group conducts current during only 60 electrical degrees with any one other valve in the other group; that is, due to the 60 degree phase displacement between the respective wye groups the two systems operate as a double three-phase wye.

The voltage impressed across the direct current circuit 2 is determined by the time at which the electric valves are rendered conducting during the respective positive half cycles of applied anode-cathode voltage. As the phase of the alternating voltages of peaked wave form transmitted to the control members 19 is retarded relative to the supply voltage, the voltage impressed across the direct current circuit is decreased, and as the phase is advanced the voltage is increased.

Excitation circuits 21—23 serve to render pairs of electric valve means conducting alternately. For example, excitation circuit 21 renders electric valve means 15 and 16 conducting during intervals displaced 180 electrical degrees.

As the load current transmitted by the translating system tends to vary, the control means 59 and the excitation circuits 21—23 cooperate to control or adjust the phase of the alternating voltages of peaked wave form supplied to the control members 19 to maintain the current supplied to the load circuit at a substantially constant value. If it be assumed that the load current tends to decrease below a predetermined range of values for which the current relay 68 is adjusted and thereby indicates a decrease in load current, the movable contact 72 thereof will engage contact 73 as illustrated in the drawings, causing the motor 64 to operate and thereby decreasing the resistance offered by the rheostat 62 and effecting an advancement in phase of the periodic voltages of peaked wave form transmitted to control members 19 of the electric valve means. This action effects an increase in the output voltage of the rectifying system to a value which will maintain the desired value of current in the direct current load circuit 2.

Within a certain range of current, the regulatory operation of the system will be accomplished exclusively by the excitation circuits 21—23. However, if the motor 64 is energized so that the limit switch 76 is closed, field winding 57 of motor 55 will be energized, causing the tap changing means 45 to change the ratio of the voltage transformation of the inductive network 3. That is, contacts 46–51, inclusive, of the contact changing means 45 will operate to connect a higher voltage ratio tap to the electric valve means of the system. In this manner, the voltage ratio transformation means is controlled to adjust a different level of voltage so that the control of the electrical condition may be accomplished substantially exclusively by the excitation circuits 21—23 within a different range of load applied to the system.

On the other hand, if the load current tends to increase above a predetermined value, causing the motor 64 to move to an extreme position and closing limit switch 75, field winding 58 of motor 55 will be energized causing operation of the tap changing means 45 to engage lower ratio taps of the secondary winding sections 5–10, inclusive.

From the above description, it will be observed that within predetermined ranges of load or current determined by the load circuit 2, the regulation of the voltage of the system is accomplished by means of the phase shifting circuits of excitation circuits 21—23 in cooperation with the current relay 68 and motor 64 and the associated rheostat 62. In the event the load on the system varies beyond the above described predetermined range, the taps of the secondary winding sections 5–10 are controlled to establish a different voltage, a transformation ratio or a different voltage level, thereby permitting the excitation circuits to take over the control of the voltage at the newly established level.

It will be understood that the operation of the motor 64, that is the control of the position thereof and the direction of rotation, is determined by the selective energization of the field windings 66, 67 which are controlled by current relay 68. When the contact 72 is in one position the motor rotates in one direction, and when the contact 72 is in the other extreme position the motor rotates in the opposite direction.

In Fig. 2 another embodiment of my invention is illustrated as applied to a system for controlling an output condition, such as the voltage or current, of an electric valve translating apparatus wherein the electric valve means is of the type comprising a grid, or grids, as the control member, or members. The electric valve means 79 may be of the type comprising a self-reconstructing type cathode, such as a mercury pool cathode 80, and includes a plurality of anodes 81, 82 and 83 and associated grids 84. Suitable starting means (not shown), such as a starting electrode and holding anode, may be employed for maintaining the mercury vapor within the electric valve means in an ionized condition.

Voltage transforming means of the variable ratio type may be interconnected between the alternating current circuit 1 and the anodes 81—83 of the electric valve means 79, and may comprise a transformer 85 having a plurality of primary windings 86 and secondary winding sections 87, 88 and 89. The secondary winding sections may be provided with a plurality of taps 90, 91 and 92 which control the voltage supplied to the electric valve means 79.

Motor 55 may be employed to operate tap changing means 93 comprising a plurality of movable contact members 94, 95 and 96 to engage selectively stationary contacts 97, 98 and 99 which are associated with the taps 90, 91 and 92 of the respective secondary winding sections 87, 88 and 89.

In the arrangement of Fig. 2, alternating voltages are impressed on the grids 84 of the electric valve means 79 by means of an excitation circuit 100 which may comprise a transformer 101 having a plurality of primary windings 102 and secondary windings 103. A suitable source of negative unidirectional biasing potential, such as a battery 104, may be connected in the excitation circuit to impress a biasing potential on the grids 84.

The excitation circuit 100 may be energized from the alternating current circuit 1 through a transformer 105 and a phase shifting device 106 of the rotary type having a stator member 107 which may be constructed to have a plurality of spaced windings thereon to produce a rotating magnetic field, and also comprising a positionable, rotatable or movable wound-rotor type member 108 the position of which controls the phase of the alternating components of voltage impressed on control grids 84.

As a means for controlling the phase of the alternating components of voltage impressed on grids 84 with respect to the voltage of circuit 1, I provide a motor 109 which may comprise an armature 110 and a pair of opposed field windings 111 and 112 which are selectively energized from a source of direct current, such as a battery 113, by the relay 68.

To control the voltage transformation ratio of the transformer 85 in response to minimum and maximum phase displacements of the alternating components of grid voltage, I provide a pair of limit switches 114 and 115 which comprise stationary contacts 116 and 117 and which may include a common movable contact 118. When the rotatable member 108 of phase shifting device 106 moves to either one of the extreme positions, the motor 55 is energized to control the transformation ratio of the transformer 85.

As in the arrangement of Fig. 1, the limit switches 114 and 115 may be adjusted to control the limits of the grid voltage phase shift at which the motor 55 is brought into operation. In this manner, the region of grid voltage-anode cathode voltage throughout which the electric valve means 79 operates may be controlled or adjusted.

If desired, the system may be arranged so that it operates to maintain constant voltage across the direct current circuit 2. In such case, the actuating coil 69 of relay 68 may be energized in response to the voltage appearing across the direct current load circuit. A switch 119 may be connected between the actuating coil 69 and a voltage divider comprising a resistance 120 to energize the actuating coil 69 in response to the voltage of the direct current load circuit.

The embodiment of my invention illustrated in Fig. 2 operates in substantially the same manner as that explained above in connection with the arrangement of Fig. 1, and serves to change the voltage transformation ratio of the transformer 85 when the alternating components of the grid voltages tend to depart from a predetermined range. Within a certain range of current transferred to the direct current circuit 2, the relay 68 when connected to be responsive to load current serves to control the phase of the alternating components of grid voltage by selectively energizing the field windings 111 and 112 of motor 109, causing the motor 109 to position the rotatable element 108 of phase shifting device 106. Upon reaching one or the other of the extreme positions indicating a desired maximum or minimum phase displacement of the alternating components of grid voltage, either the limit switch 115 or switch 116 is closed, thereby controlling motor 55 which changes the voltage taps of the secondary winding sections 87-89, inclusive. In this manner, the tap changing means 93 establishes a different region of operation by setting a different voltage transformation ratio dictated by the relay 68.

When the switch 119 is moved to the righthand position, the system is arranged so that the voltage across the direct current circuit 2 is maintained at a substantially constant value. Within a predetermined range of load applied to the system, the regulating operation is obtained by adjustment or positioning of the rotatable element 108 of the phase shifter 106. If the load on the system tends to exceed a predetermined value causing the movement of the rotor 108 to an extreme position, either limit switch 114 or 115 is closed, thereby controlling motor 55 to change the taps of windings 87—89 to a higher ratio transformation so that the range of phase shift of the alternating components of grid voltage is maintained within the desired region. In like manner, if the load tends to decrease below a predetermined value, the limit switches 114 and 115, acting through motor 55, serve to operate the tap changing mechanism 93 to select a lower ratio or lower voltage taps so that the same region of operation of the alternating components of grid voltage may be employed.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current circuit, a direct current circuit, electric translating apparatus connected between said circuits and including variable voltage transforming means and electric valve means of the type having an anode, a cathode and a control member, excitation means for impressing on said control member a voltage variable in phase with respect to the voltage of said alternating current circuit and for controlling an electrical condition of one of the first mentioned circuits and comprising a saturable inductive device, control means having predetermined limits of travel and connected to be responsive to said condition for controlling the magnetization of said saturable inductive device within said limits of travel, and a second control means including a winding connected to be energized only when said first mentioned control means is operated to either limit of travel for controlling said variable voltage transforming means.

2. In combination, an alternating current circuit, a direct current circuit, electric translating apparatus connected between said circuits and including variable voltage transforming means and electric valve means of the type having an anode, a cathode and a control member, excitation means for impressing on said control member a voltage variable in phase with respect to the voltage of said alternating current circuit and for controlling an electrical condition of one of the first mentioned circuits and comprising a saturable inductive device, control means responsive to said electrical condition for controlling the magnetization of said saturable inductive device and comprising a motor operated rheostat, means responsive to said electrical condition connected between said one of the first mentioned circuits and the motor operated rheostat, and means for controlling said variable voltage transforming means in response to the operation of said motor operated rheostat.

3. In combination, an alternating current circuit, a direct current circuit, electric translating apparatus connected between said circuits and including variable voltage transforming means and electric valve means of the type having an anode, a cathode and a control member, excitation means for impressing on said control member a voltage variable in phase with respect to the voltage of said alternating current circuit and for controlling an electrical condition of one of the first mentioned circuits and comprising a saturable inductive device, control means responsive to said electrical condition for controlling the magnetization of said inductive device and comprising a source of direct current, a variable resistance and a motor for controlling said resistance, means responsive to said electrical condition of said one circuit for controlling the operation of said motor, limit switches associated with said resistance and said motor, and means for controlling said variable voltage transforming means comprising a second motor controlled by said limit switches.

FRANK L. KAESTLE.